United States Patent
Park et al.

(10) Patent No.: US 9,888,135 B2
(45) Date of Patent: Feb. 6, 2018

(54) COMPUTING DEVICE AND SYSTEM SUPPORTING PULL PRINTING BY USING MOBILE TERMINAL, AND METHOD OF PERFORMING PULL PRINTING BY USING MOBILE TERMINAL

(71) Applicant: S-PRINTING SOLUTION CO., LTD., Suwon-si, Gyeonggi-do (KR)

(72) Inventors: Jeong-jin Park, Seongnam-si (KR); So-hye Kim, Seoul (KR); Hee-jung Kim, Seoul (KR); Jae-yeong So, Suwon-si (KR); Jun-young Choi, Suwon-si (KR); Jeong-ho Kim, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/812,080

(22) Filed: Jul. 29, 2015

(65) Prior Publication Data
US 2016/0065751 A1    Mar. 3, 2016

(30) Foreign Application Priority Data
Aug. 27, 2014   (KR) ........................ 10-2014-0112329

(51) Int. Cl.
  *H04N 1/00*    (2006.01)
  *G06F 3/12*    (2006.01)
(52) U.S. Cl.
  CPC ......... *H04N 1/0023* (2013.01); *G06F 3/1204* (2013.01); *G06F 3/1218* (2013.01); *G06F 3/1226* (2013.01); *G06F 3/1231* (2013.01); *G06F 3/1253* (2013.01); *G06F 3/1267* (2013.01); *G06F 3/1276* (2013.01);
  (Continued)

(58) Field of Classification Search
  None
  See application file for complete search history.

(56) References Cited

U.S. PATENT DOCUMENTS

| 8,125,664 B2 * | 2/2012 | Tomita ............... H04N 1/00204 358/1.13 |
| 2004/0160623 A1 * | 8/2004 | Strittmatter ......... H04M 1/7253 358/1.15 |

(Continued)

FOREIGN PATENT DOCUMENTS

EP    1450515    8/2004

OTHER PUBLICATIONS

European Search Report dated Jan. 20, 2016 in European Patent Application No. 15182205.3.

*Primary Examiner* — Miya J Williams
(74) *Attorney, Agent, or Firm* — Staas & Halsey LLP

(57) ABSTRACT

A computing device supports pull printing by using a mobile terminal. The computing device may include a user interface unit configured to receive an input selecting a print job and a printing method; a communication unit configured to transmit or receive data; a mobile search management unit configured to search for an available mobile terminal if pull printing by using a mobile terminal is selected as the printing method; a printer driver configured to render print data corresponding to the selected print job into a printable format file; a data transmission management unit configured to transmit the rendered print data to a found mobile terminal by using the communication unit; and a controller.

19 Claims, 21 Drawing Sheets

(52) U.S. Cl.
CPC .......... *G06F 3/1288* (2013.01); *G06F 3/1292* (2013.01); *H04N 1/00217* (2013.01); *H04N 1/00244* (2013.01)

(56) References Cited

U.S. PATENT DOCUMENTS

| | | | |
|---|---|---|---|
| 2005/0068564 A1* | 3/2005 | Ferlitsch | G06F 3/1204 358/1.15 |
| 2006/0112427 A1* | 5/2006 | Shahbazi | G06F 21/50 726/16 |
| 2007/0182984 A1* | 8/2007 | Ragnet | G06Q 30/0283 358/1.15 |
| 2007/0182985 A1* | 8/2007 | Ciriza | G06F 21/608 358/1.15 |
| 2011/0191417 A1* | 8/2011 | Rathod | G06Q 30/02 709/204 |
| 2011/0216349 A1* | 9/2011 | McCorkindale | G06F 15/00 358/1.15 |
| 2011/0317215 A1* | 12/2011 | Ida | G06F 3/1222 358/1.15 |
| 2011/0319017 A1* | 12/2011 | Lee | H04M 1/6066 455/41.1 |
| 2013/0072119 A1* | 3/2013 | Park | H04W 8/005 455/41.2 |
| 2013/0179299 A1 | 7/2013 | Crutcher et al. | |
| 2013/0267177 A1* | 10/2013 | Umezawa | H04L 63/0492 455/41.2 |
| 2014/0176991 A1* | 6/2014 | Yun | H04W 64/00 358/1.15 |
| 2014/0233052 A1* | 8/2014 | Meike | G06F 3/1219 358/1.13 |
| 2014/0293314 A1* | 10/2014 | Amarendra | G06F 21/35 358/1.14 |
| 2014/0368867 A1* | 12/2014 | Kim | G06F 3/1204 358/1.15 |

* cited by examiner

DISPLAY LIST OF MOBILE TERMINALS USED BEFORE

USER TERMINAL INFORMATION STORED IN REGISTRY

FIG. 10
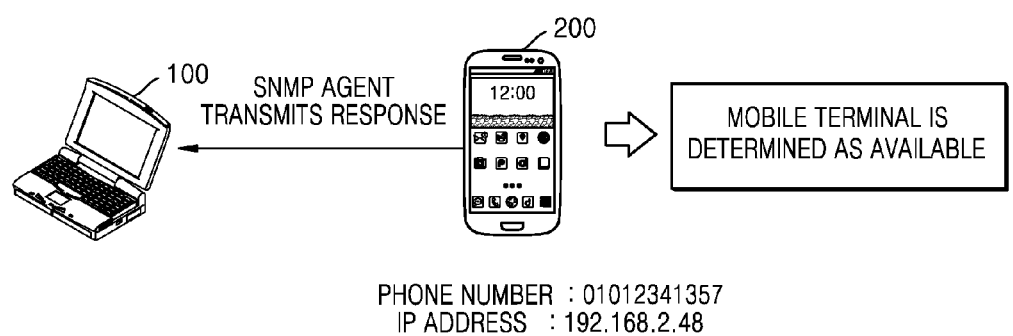
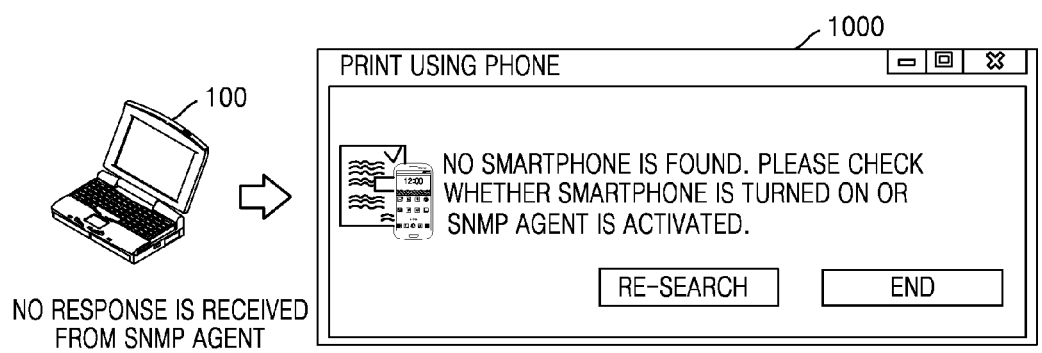

COMPUTING DEVICE AND SYSTEM SUPPORTING PULL PRINTING BY USING MOBILE TERMINAL, AND METHOD OF PERFORMING PULL PRINTING BY USING MOBILE TERMINAL

CROSS-REFERENCE TO RELATED APPLICATIONS

This application claims the priority benefit of Korean Patent Application No. 10-2014-0112329, filed on Aug. 27, 2014, in the Korean Intellectual Property Office, the disclosure of which is incorporated herein in its entirety by reference.

BACKGROUND

1. Field

One or more exemplary embodiments relate to methods of performing pull printing by using a mobile terminal, and a computing device and a system for performing pull printing by using a mobile terminal.

2. Description of the Related Art

To store content of a PC in a mobile terminal such as a smartphone and print the content in a desired situation and at a desired place, the following method may be used: first, the content is transmitted to the smartphone by connecting the PC and the smartphone together via a USB cable or the content is attached to an email on the PC and downloaded by the smartphone by accessing the email account, or the content is transmitted to a cloud server on the PC and then downloaded to the smartphone by accessing the cloud server, and then the content is transmitted from the smartphone to the printer to print the content. However, these processes are all complicated or difficult to use, and moreover, as content is rendered in a mobile app installed on the smartphone, printing quality degrades.

As a method of improving convenience of a print job, pull printing, in which content is stored in a server and transmitted to a desired printer to print the content, may be used. However, pull printing requires a server where the content is stored, thus resulting in the cost for purchase and maintenance of the server.

SUMMARY

One or more exemplary embodiments include methods, apparatuses, and systems for performing pull printing by using a mobile terminal instead of a server.

According to one or more exemplary embodiments, there is provided a computing device supporting pull printing by using an available mobile terminal, the computing device may comprise a user interface unit configured to receive an input to select a print job and a printing method; a communication unit configured to transmit or receive data; a mobile search management unit configured to search for the available mobile terminal if pull printing by using the available mobile terminal is selected as the printing method; a printer driver configured to render print data corresponding to the selected print job into a printable format file; a data transmission management unit configured to transmit the rendered print data to the available mobile terminal by using the communication unit; and a controller which controls the user interface unit, the communication unit, the mobile search management unit, the printer driver and the data transmission management unit.

. . . In an aspect of one or more embodiments, there is provided a computing device supporting pull printing by using one of a plurality of available mobile terminals, the computing device comprising: a user interface unit configured to receive an input to select a print job and a printing method; a communication unit configured to transmit or receive data; a mobile search management unit configured to search for available mobile terminals if pull printing by using one of the available mobile terminals is selected as the printing method; a printer driver configured to render print data corresponding to the selected print job into a printable format file; a data transmission management unit configured to transmit the rendered print data to one of the available mobile terminals by using the communication unit; and a controller which controls the user interface unit, the communication unit, the mobile search management unit, the printer driver and the data transmission management unit, wherein the mobile search management unit acquires identification information of the available mobile terminals and displays the identification information on the user interface unit, and wherein the data transmission management unit transmits the rendered print data to the one of the available mobile terminals corresponding to identification information selected by a user from among the identification information of the available mobile terminals.

The mobile search management unit may acquire a plurality of phone numbers, a plurality of IP addresses, and a plurality of port numbers of available mobile terminals connected to a network and display the acquired phone numbers on the user interface unit, and the data transmission management unit may transmit, by using one of the acquired IP address and one of the acquired port numbers, the rendered print data to the one of the available mobile terminals corresponding to one of the phone numbers selected by a user from among the displayed phone numbers.

The mobile search management unit may transmit a packet requesting the one of the phone numbers of the one of the available mobile terminals to the network by using a user datagram protocol (UDP) and receives a data packet including the one of the phone numbers of the mobile terminals from a simple network management protocol (SNMP) of the one of the available mobile terminals connected to the network.

If a list of previously used mobile terminals exists, the mobile search management unit may display the list of previously used mobile terminals on the user interface unit, and when one of the previously used mobile terminals is selected from the list of previously used mobile terminals, the mobile search management unit may request an SNMP agent of the selected previously used mobile terminal to determine whether the selected previously used mobile terminal is available.

The printer driver may render objects included in the print data into a raw image, convert the raw image to an image format file, and generate the printable format file including the image format file.

The user interface unit may provide a screen via which a printing option regarding the print job is set, and the printer driver may apply the set printing option set via the user interface unit to the print data and render the print data to which the set printing option is applied.

The printer driver may inquire the data transmission management unit whether pull printing by using the available mobile terminal is possible, and if the mobile search management unit succeeds in searching for the available mobile terminal, the data transmission management unit may respond to the printer driver that pull printing by using the available mobile terminal is possible.

According to one or more exemplary embodiments, there is provided a system supporting pull printing by using a mobile terminal, which may include: a computing device configured to receive a user input to select a print job and a printing method and configured to render print data corresponding to the selected print job; a mobile terminal configured to receive the rendered print data from the computing device and configured to store the rendered print data; and an image forming apparatus configured to receive the stored print data from the mobile terminal to print the print data, wherein when pull printing by using the mobile terminal is selected as the printing method, the computing device searches for the mobile terminal and renders the print data into a printable format file to transmit the rendered print data to the mobile terminal.

When the mobile terminal receives a print request for the stored print data, the mobile terminal may search for an available image forming apparatus and transmit the stored print data to the available image forming apparatus.

According to one or more exemplary embodiments, there is provided a method of performing pull printing by using an available mobile terminal which may include receiving of a user input to select a print job and pull print by using the available mobile terminal as a printing method; searching for the available mobile terminal; rendering print data corresponding to the selected print job into a printable format file; and transmitting the rendered print data to the available mobile terminal which is found during the search.

In an aspect of one or more embodiments, there is provided a method of performing pull printing by using one of a plurality of available mobile terminals, the method may comprise receiving a user input to select a print job and to pull print by using one of the available mobile terminals as a printing method; searching for available mobile terminals; rendering print data corresponding to the selected print job into a printable format file; and transmitting the rendered print data to one of the available mobile terminals which was found during the search, wherein the transmitting of the rendered print data to one of the available mobile terminals comprises: displaying identification information of the available mobile terminals on a screen; receiving information indicating one selected piece of identification information of the available mobile terminals; and transmitting the rendered print data to one of the available mobile terminals corresponding to the one selected piece of identification information.

The searching for available mobile terminals may include acquiring a plurality of phone numbers, a plurality of corresponding IP addresses and a plurality of corresponding port numbers of mobile terminals connected to a network, wherein the transmitting the rendered print data to the one of the available mobile terminals may include displaying the phone numbers of available mobile terminals on a screen of a computing device; receiving information indicating a phone number of the one of the available mobile terminals that is selected; and transmitting the rendered print data to the one of the available mobile terminals corresponding to the selected phone number by using the corresponding acquired IP address and the corresponding acquired port number.

The searching for available mobile terminals may include: transmitting a data packet requesting a phone number of the one of the available mobile terminals by using a user datagram protocol (UDP) to the network; and receiving a data packet including the phone number of the one of the available mobile terminals from a simple network management protocol (SNMP) of the one of the mobile terminals connected to the network.

The searching for an available mobile terminal may include: if a list of previously used mobile terminals exists, displaying the list of previously used mobile terminals on a user interface unit; and when one of the previously used mobile terminals of the list of previously used mobile terminals is selected, requesting an SNMP agent of the selected previously used mobile terminal to determine whether the selected previously used mobile terminal is available.

The rendering may include: rendering objects included in the print data into a raw image; converting the raw image into an image format file; and generating the printable format file including the image format file.

The receiving of the user input to select pull printing as a printing method by using the available mobile terminal may include receiving information indicating a printing option regarding the selected print job, and the rendering may include applying the set printing option to the print data and rendering the print data to which the printing option is applied.

In an aspect of one or more embodiments, there is provided a mobile terminal supporting pull printing which may include a communication unit configured to receive a check availability for pull printing request from a computing device and configured to transmit an available for pull printing response to the computing device; the communication unit configured to receive, store, and transmit rendered print data in a printable format file; and a display unit configured to display a user interface for selection of a list of available image forming apparatuses for printing rendered print data and for selection of rendered print data in the printable format file generated by the computing device from among printable format files.

In an aspect of one or more embodiments, there is provided at least one non-transitory computer readable medium storing computer readable instructions which when executed implement methods of one or more embodiments.

BRIEF DESCRIPTION OF THE DRAWINGS

These and/or other aspects will become apparent and more readily appreciated from the following description of exemplary embodiments, taken in conjunction with the accompanying drawings in which:

FIGS. 8 through 10 are diagrams for explaining a process of searching for available mobile terminals if a list of mobile terminals that have been used before exists, according to an exemplary embodiment;

DETAILED DESCRIPTION

Figure 1:
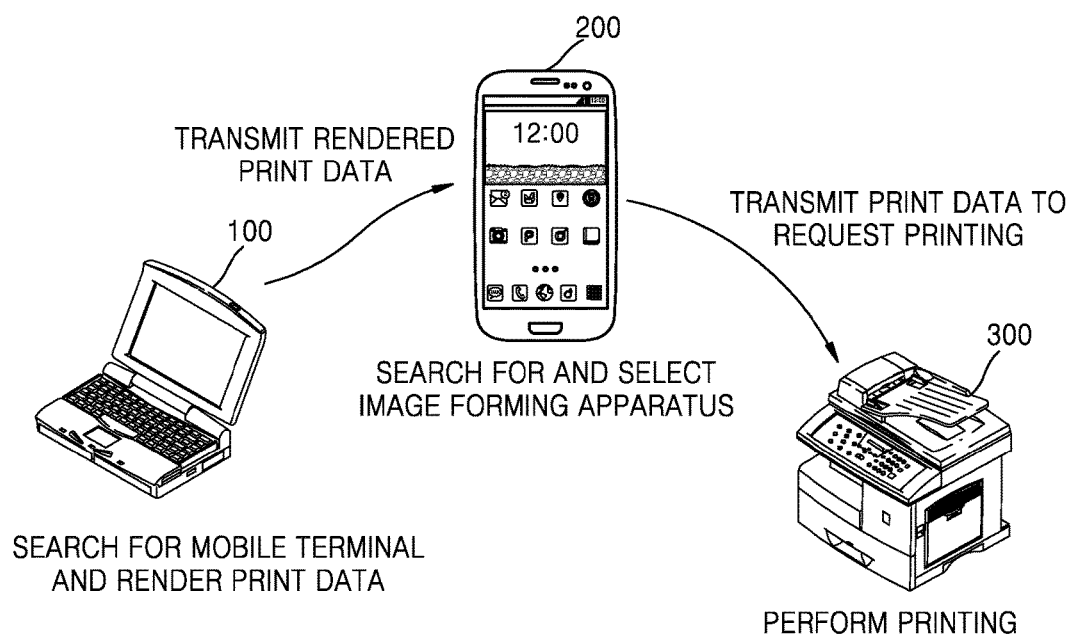
FIG. 1 illustrates an environment in which a method of performing pull printing by using a mobile terminal is performed, according to an exemplary embodiment is performed.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, exemplary embodiments are merely described below, by referring to the figures, to explain aspects of embodiments. For clarity of description of the features of embodiments, details that are well known to one of ordinary skill in the art will be omitted. As used herein, the term "and/or" includes any and all combinations of one or more of the associated listed items.

FIG. 1 illustrates an environment in which a method of performing pull printing by using a mobile terminal, according to an exemplary embodiment, is performed.

Referring to FIG. 1, in order to perform the method of performing pull printing by using a mobile terminal, according to an exemplary embodiment of the present disclosure, a computing device 100, a mobile terminal 200, and an image forming apparatus 300 are involved.

The computing device 100 may be a desktop computer or a laptop, but is not limited thereto, and may be other various devices, to or from which print data may be transmitted or received and which include a printer driver. Also, the mobile terminal 200 may be a smartphone, a wearable digital device, a personal digital assistant, portable media player, digital camera, portable game player, or a tablet, but is not limited thereto, and may be various other terminals, to or from which print data may be transmitted or received and which include a printer driver. Also, the image forming apparatus 300 may be a printer or a multi-functional printer, but is not limited thereto, and may be other various devices, to or from which print data may be transmitted or received and which include a printer driver.

According to the method of performing pull printing by using a mobile terminal, according to an exemplary embodiment of the present disclosure, the computing device 100 may search for an available mobile terminal and renders print data to be transmitted to a found mobile terminal. The computing device 100 renders print data into a printable format file. For example, the computing device 100 may render print data into a PDF file, or into a format file which satisfies both conditions of a format file that a mobile terminal is able to open and of a format file that an image forming apparatus is able to print. The computing device 100 transmits the print data rendered into a printable file, to the mobile terminal 200. A configuration of the computing device 100 will be described in detail later with reference to FIG. 20.

The mobile terminal 200 receives from the computing device 100 the print data rendered into a printable format file and stores the same, and if a print command is received, the mobile terminal 200 may transmit the stored print data to the image forming apparatus 300 to request printing. The mobile terminal 200 may search for an available image forming apparatus, and a user may select an available image forming apparatus. The mobile terminal 200 may also provide a preview of the stored print data according to a user's request. A configuration of the mobile terminal 200 will be described in detail later with reference to FIG. 21.

The image forming apparatus 300 may receive the print data from the mobile terminal 200 and prints the received print data. The image forming apparatus 300 may receive the print data from the mobile terminal 200 by using a method such as Wi-Fi, Wi-Fi Direct, Bluetooth, ZigBee, ultra wideband (UWB), infrared data association (IrDA), Bluetooth low energy (BLE), near field communication (NFC), a radio frequency (RF) or other various communication methods.

As described above, in pull printing by using a mobile terminal, according to an exemplary embodiment of the present disclosure, the mobile terminal 200 functions as a server of conventional pull printing, and thus, the costs for purchase and maintenance of a server may be saved. Also, as the computing device 100 is in charge of rendering print data, printing quality may be improved, compared to when the mobile terminal 200 itself performs rendering.

Figure 2:
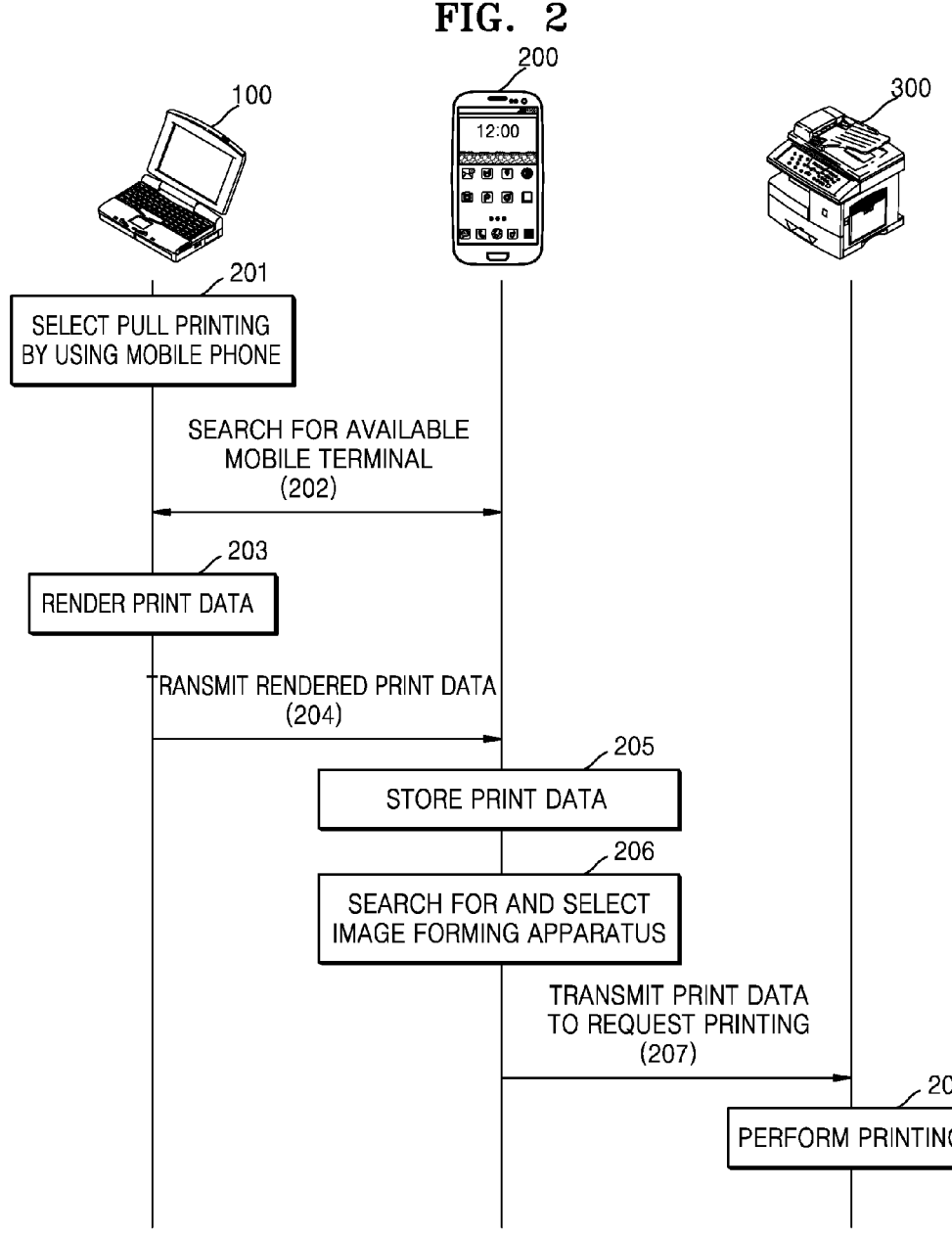
FIG. 2 is a diagram for explaining a method of performing pull printing by using a mobile terminal, according to an exemplary embodiment.

FIG. 2 is a diagram for explaining a method of performing pull printing by using a mobile terminal, according to an exemplary embodiment of the present disclosure.

Referring to FIG. 2, the computing device 100 receives information indicating that pull printing by using a mobile terminal is selected as a printing method in operation 201. Selection of a printing method will be described in detail later with reference to FIGS. 4 and 5.

In operation 202, the computing device 100 searches for an available mobile terminal. The computing device 100 may search for a new mobile terminal or display a list of mobile terminals that have been used before, on a screen, and if a user selects any mobile terminal, the computing device 100 may check the availability of the selected mobile terminal. Searching for a mobile terminal will be described in detail later with reference to FIGS. 6 to 10.

In operation 203, the computing device 100 performs rendering on print data. A printer driver of the computing device 100 renders print data into a file of a printable format. For example, a printer driver of the computing device 100 may render print data into a PDF file. Rendering print data will be described in detail below with reference to FIGS. 11 and 12.

In operation 204, the computing device 100 transmits rendered print data to the mobile terminal 200. Transmission of print data will be described in detail below with reference to FIGS. 13A and 13B.

In operation 205, the mobile terminal 200 stores received print data.

In operation 206, the mobile terminal 200 searches for available image forming apparatuses and receives information indicating an image forming apparatus, which is selected by a user from among found image forming apparatuses, that is to perform printing.

In operation 207, the mobile terminal 200 transmits the print data to the selected image forming apparatus 300 to request printing.

In operation 208, the image forming apparatus 300 prints the received print data.

Searching for an image forming apparatus and printing performed by an image forming apparatus will be described in detail below with reference to FIGS. 15A and 15B.

Figure 3:
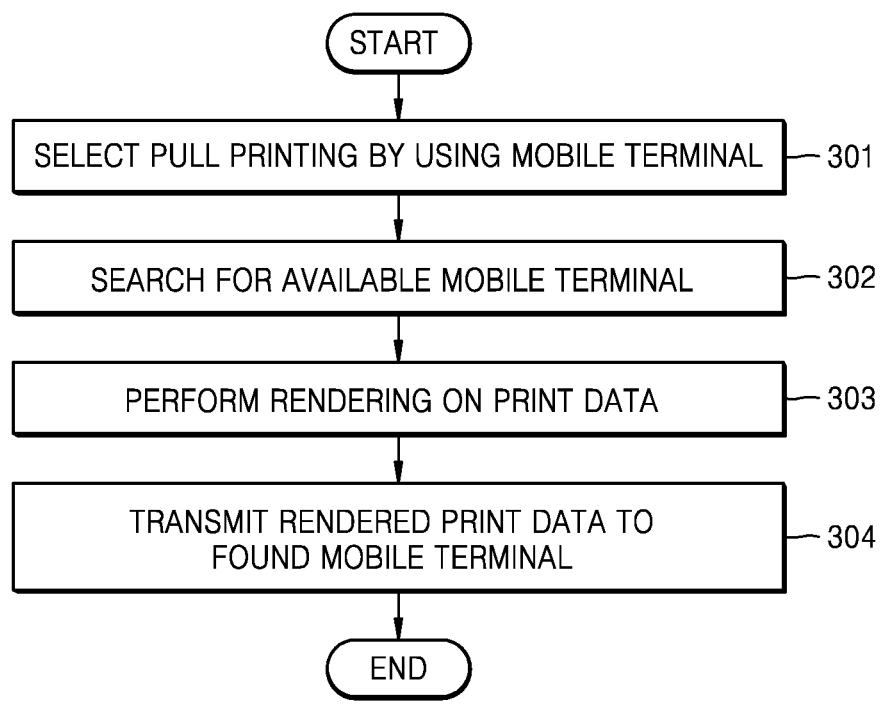
FIG. 3 is a flowchart of a method of performing pull printing by using a mobile terminal, according to an exemplary embodiment.

FIG. 3 is a flowchart of a method of performing pull printing by using a mobile terminal, according to an exemplary embodiment of the present disclosure. In particular, operations illustrated in the flowchart of FIG. 3 correspond to operations performed by the computing device 100 of FIG. 1.

Referring to FIG. 3, when pull printing by using a mobile terminal is selected in operation 301, the computing device 100 searches for an available mobile terminal in operation 302. When an available mobile terminal is found, print data is rendered into a printable format file in operation 303, and the rendered print data is transmitted to the found mobile terminal in operation 304.

Figure 4:
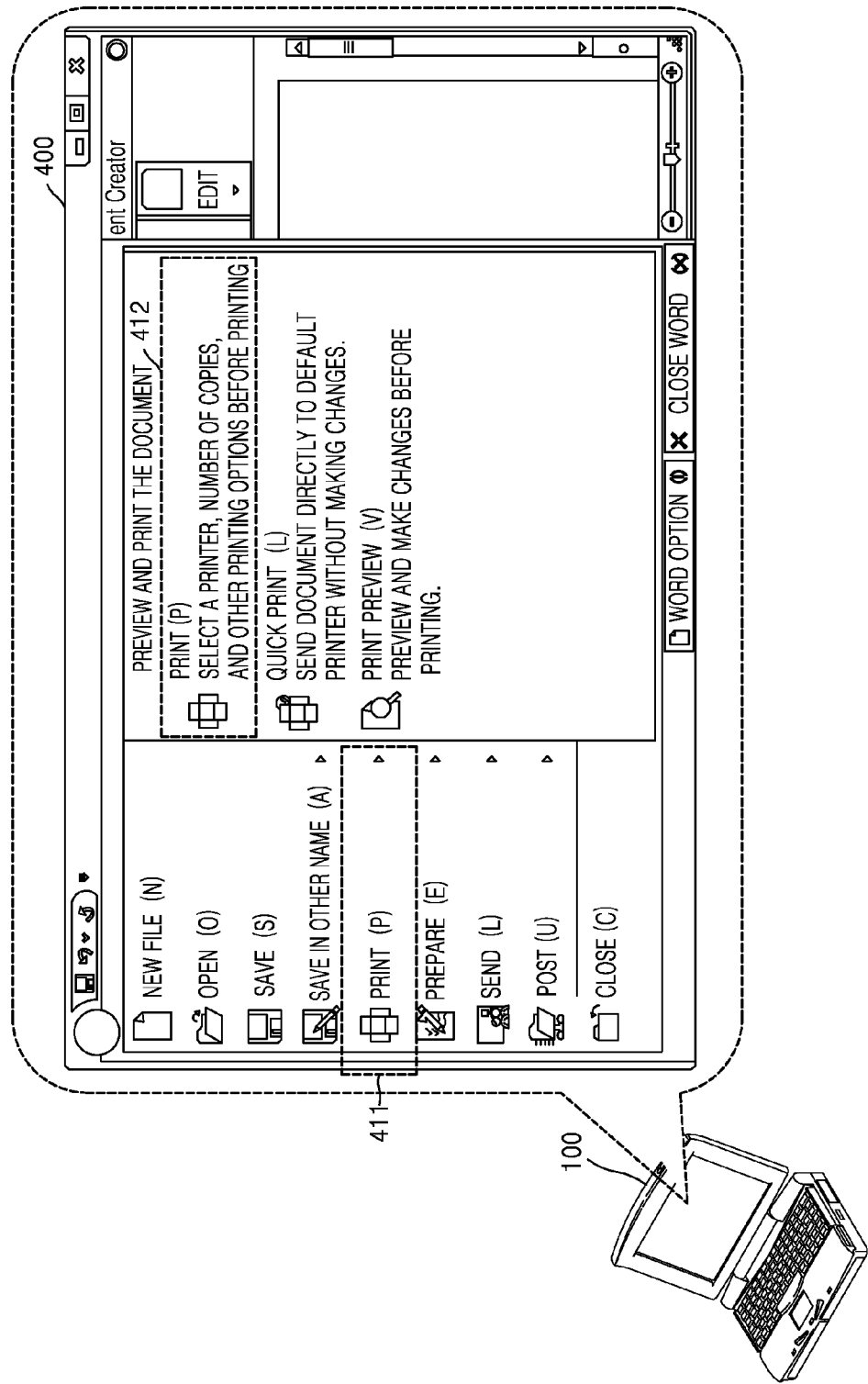
FIGS. 4 and 5 are diagrams for explaining a process of selecting pull printing by using a mobile terminal, from among printing methods, according to an exemplary embodiment.
Figure 5:
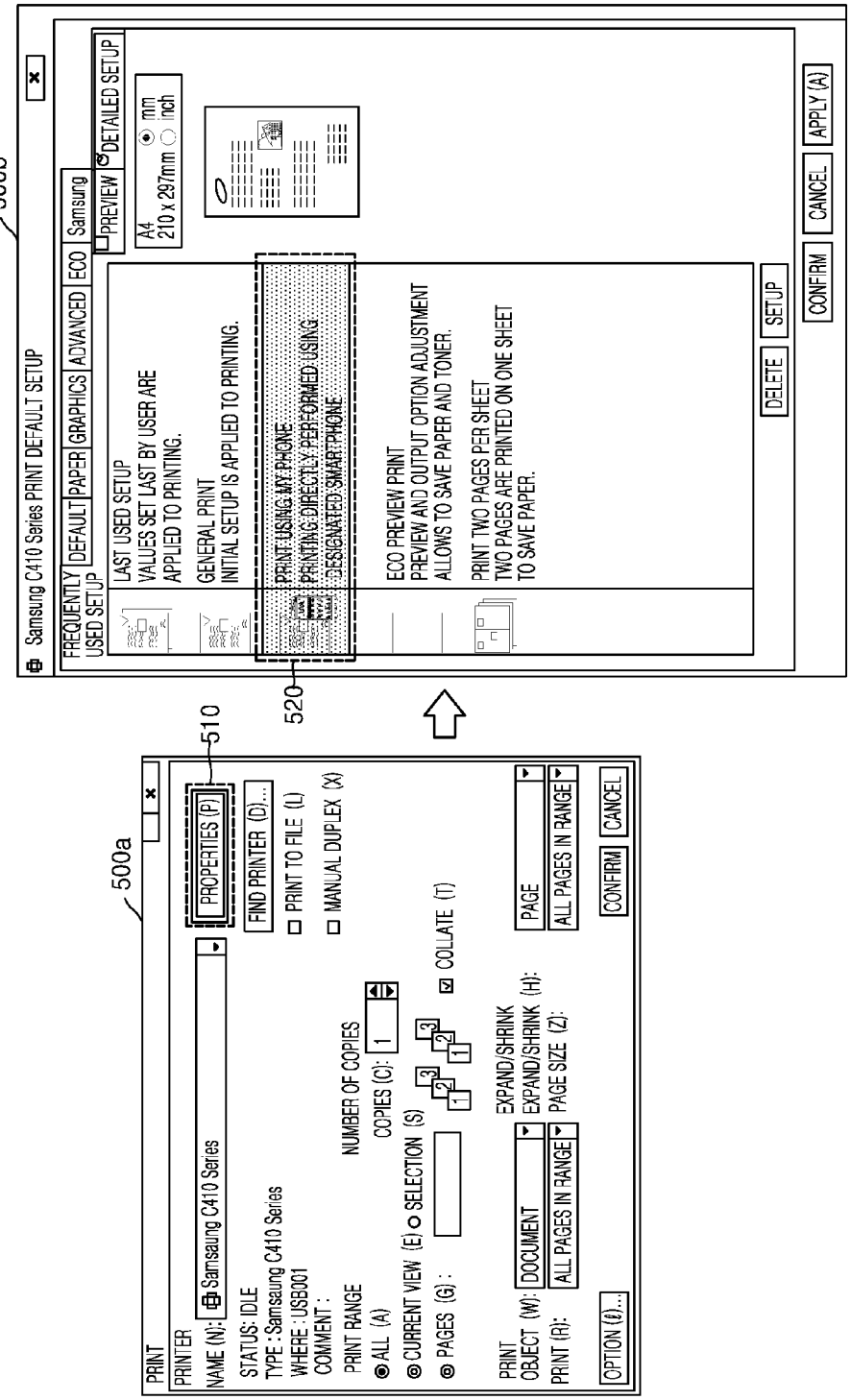

FIGS. 4 and 5 are diagrams for explaining a process of selecting pull printing by using a mobile terminal, as a printing method, according to an exemplary embodiment of the present disclosure.

Referring to FIG. 4, a screen 400 via which printing of a print job is requested is displayed on a display unit of the computing device 100. Here, a print job means various contents such as a document or an image which is an object to be printed. On the screen 400 of FIG. 4, an example in which a document generated by a document generating program is selected as a print job is illustrated. As illustrated in FIG. 4, when a print button 411 is selected on the screen 400, sub-menus such as print, quick print, and printing preview are displayed, and then if print 412 is selected from the sub-menus, a popup via which a print setup is set is displayed. The popup via which a print setup is set is illustrated in FIG. 5.

Referring to FIG. 5, the popup via which a print setup is set is illustrated on a first screen 500a. On the first screen 500a, various print options such as the number of printing pages or the number of pages to be printed on a single page may be set.

If a 'Properties' button 510 is selected on the first screen 500a, a second screen 500b via which other specific print options are set and a printing method is selected is displayed. Among items displayed on the second screen 500b, "PRINT USING MY PHONE" 520 corresponds to pull printing by using a mobile phone according to an exemplary embodiment of the present disclosure. Thus, if "PRINT USING MY PHONE" 520 is selected, the computing device 100 determines that pull printing by using a mobile phone has been selected as a printing method, and starts searching for an available mobile terminal.

Figure 6:
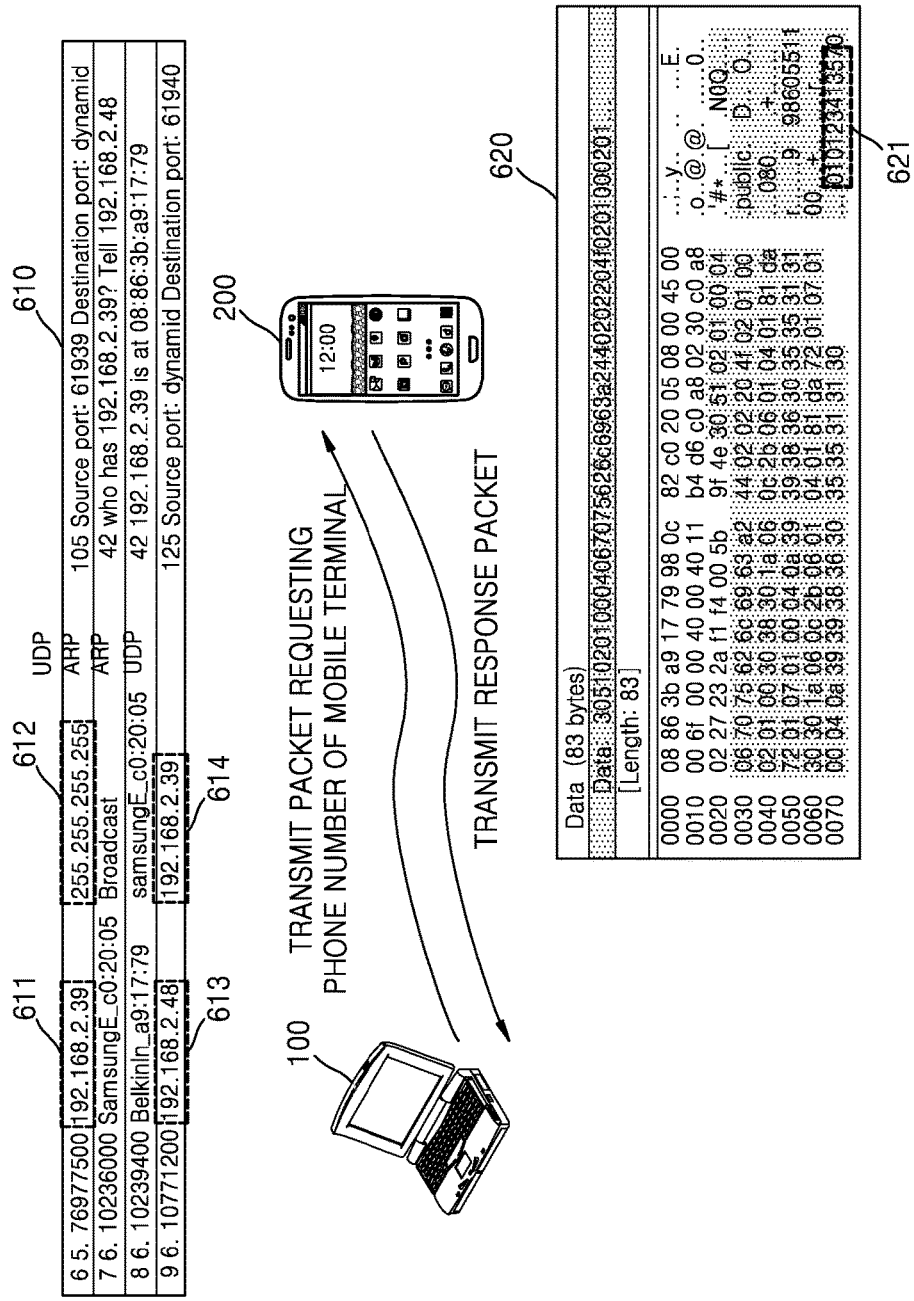
FIGS. 6 and 7 are diagrams for explaining a process of searching for an available mobile terminal, according to an exemplary embodiment.
Figure 7:
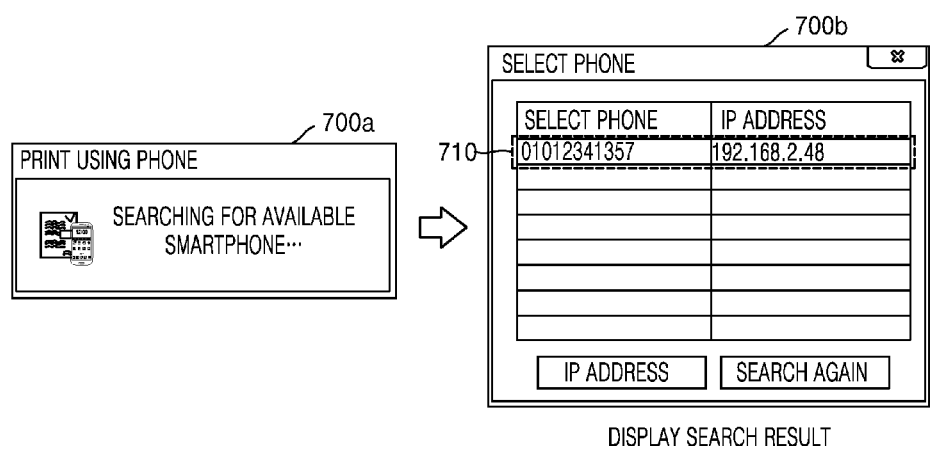

FIGS. 6 and 7 are diagrams for explaining a process of searching for an available mobile terminal, according to an exemplary embodiment of the present disclosure.

Referring to FIG. 6, the computing device 100 may transmit a packet requesting a phone number to the mobile terminal 200, and the mobile terminal 200 may transmit a response packet including the phone number to the computing device 100. The phone number of the mobile terminal 200 is requested because phone numbers are appropriate as identification information of the mobile terminal 200. Thus, besides phone numbers, other information that may be used as identification information of the mobile terminal 200 such as a model name of the mobile terminal 200 or a name set to the mobile terminal 200 by a user may be requested.

FIG. 6 illustrates a transmission record 610 of packets between the computing device 100 and the mobile terminal 200. Referring to record No. 6 in the uppermost line of the transmission record 610, an IP address 611 of the computing device 100 is 192.168.2.39, and the computing device 100 sets an IP address 612 of a destination to 255.255.255.255 and sends a packet requesting a phone number by using a user datagram protocol (UDP). The mobile terminal 200 generates a packet including a phone number in response to the packet received from the computing device 100 and sends the packet including the phone number to the computing device 100. Referring to record No. 9 in the lowermost line of the transmission record 610, an IP address 613 of the mobile terminal 200 is 192.168.2.48, and the mobile terminal 200 transmits the generated packet to the IP address of the computing device 100 set as an IP address 614 of a destination.

Data 620 including a phone number of the mobile terminal 200, included in the packet transmitted by the mobile terminal 200 to the computing device 100 is illustrated in FIG. 6. Referring to FIG. 6, a phone number (01012341357) of the mobile terminal 200 is included in an area 621 of the data 620 included in the packet.

FIG. 7 illustrates a screen displayed while the computing device 100 searches for an available mobile terminal and a screen displayed on the computing device 100 after searching for a mobile terminal is completed.

Referring to FIG. 7, while the computing device 100 searches for an available mobile terminal, a popup message indicating that a mobile terminal is being searched for is displayed, as shown on a first screen 700a. When the search is completed, a popup indicating a search result is displayed as shown on a second screen 700b. Identification information 710 of the mobile terminal 200, that is, a phone number and an IP address of the mobile terminal 200, is displayed on the second screen 700b.

Although the computing device 100 acquired only the phone number of the mobile terminal 200 in an embodiment of FIG. 6, the computing device 100 may further acquire an IP address or a port number of the mobile terminal 200 in addition to the phone number. Also, the acquired IP address or the acquired port number of the mobile terminal 200 may be displayed on a popup showing a search result with the phone number, or may be used when transmitting print data to the mobile terminal 200. Also, the second screen 700b, which is a popup showing a search result, may display other information that may identify the mobile terminal 200 besides the phone number or the IP address.

The user may select, on the second screen 700b, the identification information 710 of the mobile terminal 200 that is found and select a print button to thereby request pull printing by using the found mobile terminal.

Alternatively, if the user wishes to search for a different mobile terminal than mobiles terminals displayed on the second screen 700b, the user may select a search button of the second screen 700b again so that a mobile terminal is searched for again.

Information about mobile terminals used to perform pull printing before may be stored in the computing device 100.

Hereinafter, a process of displaying, if information about mobile terminals used to perform pull printing before exists in the computing device 100, a list of mobile terminals used before, and checking the availability of a mobile terminal selected by a user will be described with reference to FIGS. 8 through 10.

Figure 8:
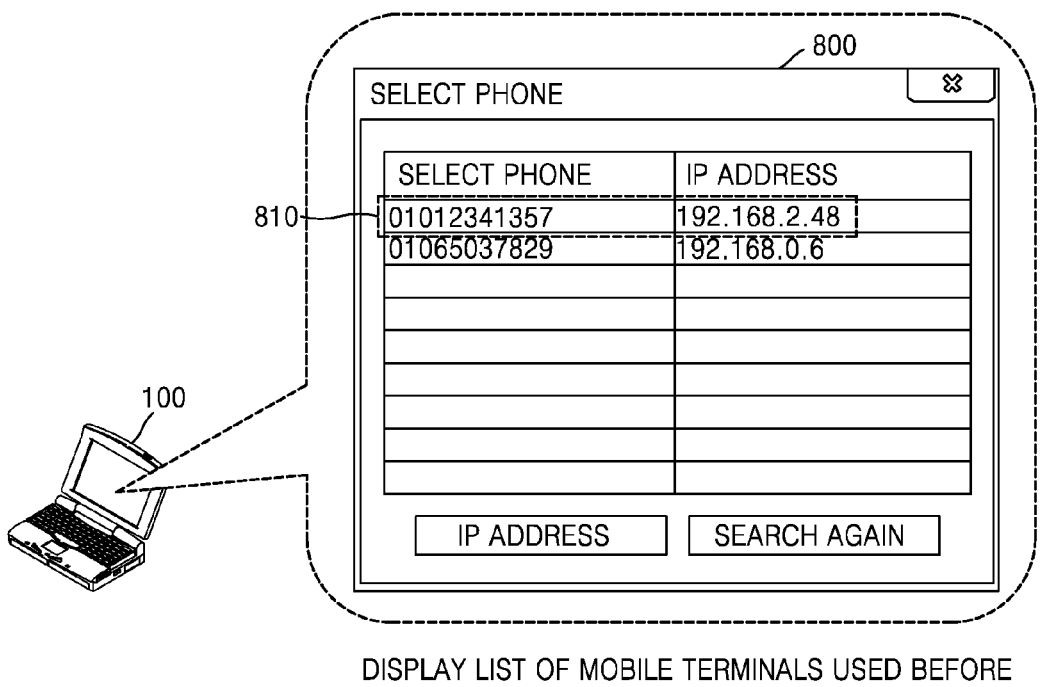

Referring to FIG. 8, the display unit of the computing device 100 displays a list of mobile terminals used to perform pull printing before, as shown on a first screen 800. Information regarding the mobile terminals used to perform pull printing before may be stored in a registry of the computing device 100, as displayed on a second screen 850.

When the user selects identification information 810 of one of two mobile terminals displayed on a popup on the first screen 800 of FIG. 8 and selects a print button, the computing device 100 checks the availability of a mobile terminal corresponding to the selected identification information 810. Here, in addition to a phone number or an IP address, a model name or a name set by the user or the like may also be used as identification information of a mobile terminal.

If the user wishes to search for a different mobile terminal than the mobile terminals displayed on the first screen 800, the user may select a search button again of the first screen 800 so as to also search for mobile terminals that are connected to peripheral networks besides the mobile terminals included in the list.

Figure 9:
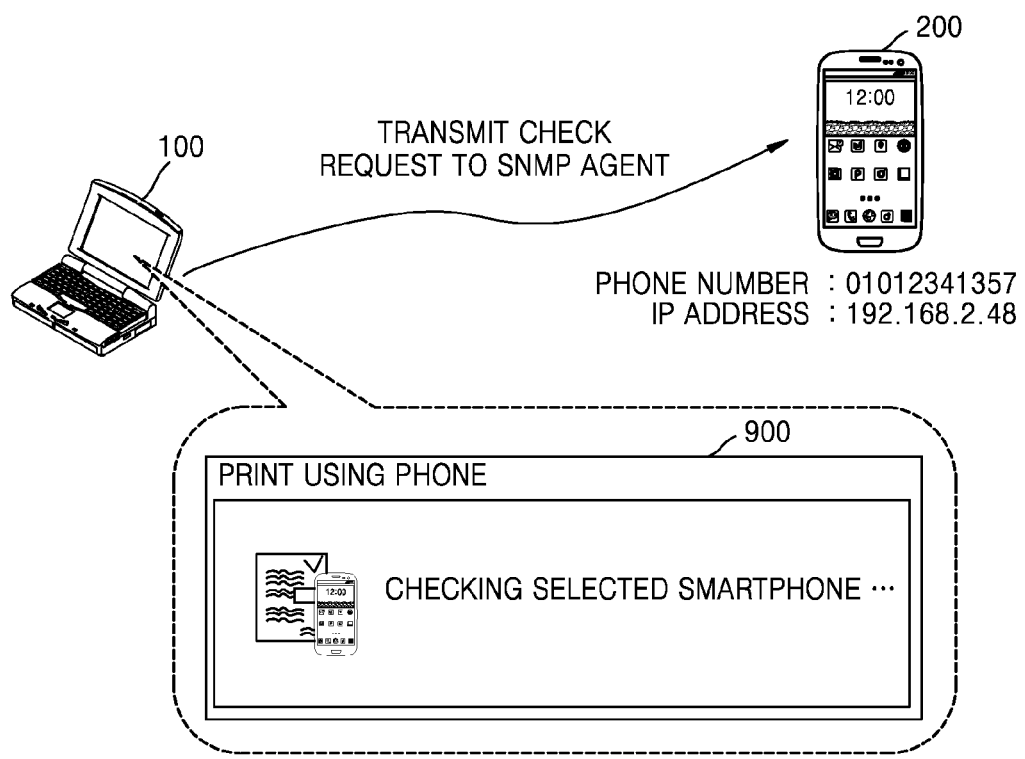

Referring to FIG. 9, the computing device 100 transmits a check request to the selected mobile terminal 200 in order to check the availability of the selected mobile terminal 200. In detail, the computing device 100 transmits a check request to a simple network management protocol (SNMP) agent of the mobile terminal 200 corresponding to the identification information 810 selected on the first screen 800 of FIG. 8. When a response is received from the SNMP agent of the mobile terminal 200 within a predetermined period of time, the computing device 100 determines that the mobile terminal 200 is available. However, if no response is received from the mobile terminal 200 within a predetermined period of time, the computing device 100 determines that the mobile terminal 200 is not available.

While the computing device 100 is waiting for a response after transmitting a check request to the SNMP agent of the mobile terminal 200, a popup 900 including a message indicating that the availability of a mobile terminal is being checked may be displayed on a screen.

Referring to FIG. 10, upon receiving a response from the SNMP agent of the mobile terminal 200, the computing device 100 determines that the mobile terminal 200 is available and performs a next operation.

On the other hand, if no response is received from the SNMP agent of the mobile terminal 200, the computing device 100 determines that the mobile terminal 200 is not available, and may display a popup 1000 via which a search again or an end is selected.

Figure 11:
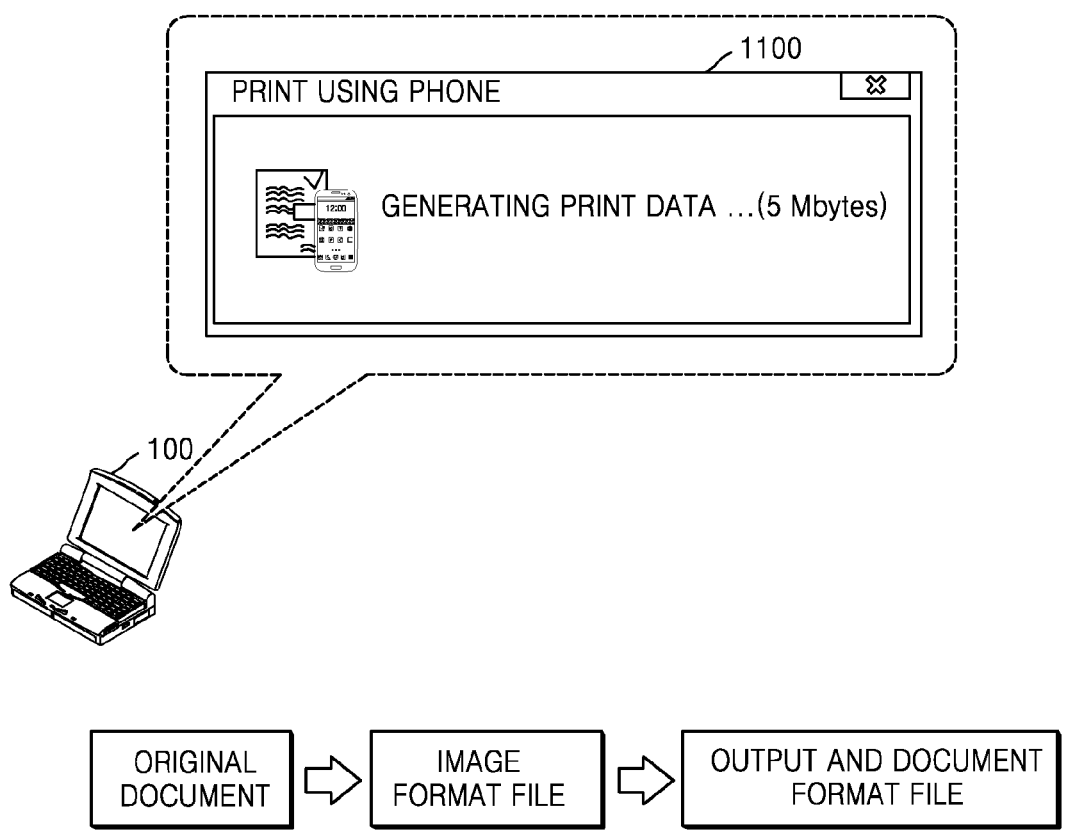
FIG. 11 is a view for explaining a process of rendering print data to be transmitted to a mobile terminal, according to an exemplary embodiment.

FIG. 11 is a diagram for explaining a process of rendering print data to be transmitted to a mobile terminal, according to an exemplary embodiment of the present disclosure.

When a mobile terminal to be used to perform pull printing is determined, the computing device 100 renders print data to be transmitted to the mobile terminal. That is, a printer driver of the computing device 100 renders print data corresponding to a print job selected by the user, into a printable format file. While rendering print data, the computing device 100 may display on a screen a popup 1100 including a message indicating that print data is being generated.

Rendered print data is to be in an output format file in order to be immediately printable, and is to be in a document format file in order to be opened by a mobile terminal. Thus, a printer driver needs to render print data into a format file that satisfies the above two conditions, and for example, the print data may be rendered into a PDF file. A PDF file is easy to generate by a printer driver and is universal, and thus, may be easily opened by most mobile terminals.

In order to render print data finally into a PDF file, a printer driver converts objects included in print data into an image format file which a PDF file may include, as an intermediate process. For example, a printer driver may convert objects included in print data to a JPEG file. A JPEG file is advantageous in terms of image quality and capacity of an image.

In sum, the printer driver of the computing device 100 may perform rendering on print data by converting objects included in print data to an image format file and generating an output and document format file including the converted image format file. Rendering on print data will be described below in detail with reference to FIG. 12.

Figure 12:
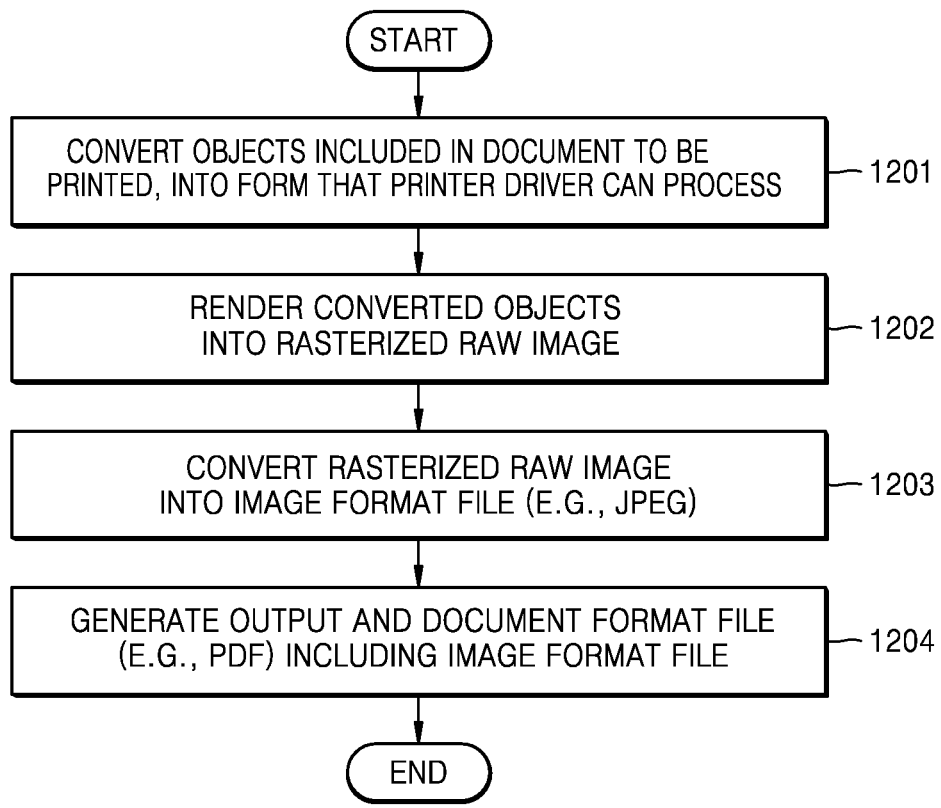
FIG. 12 is a flowchart of a process of rendering print data to be transmitted to a mobile terminal according to an exemplary embodiment.

FIG. 12 is a flowchart of a process of rendering print data to be transmitted to a mobile terminal, according to an exemplary embodiment of the present disclosure.

Referring to FIG. 12, if a print request for a document generated in an application program of the computing device 100 is received, a graphics device interface (GDI) of an operating system of the computing device 100 converts objects such as text, graphics, or an image included in a document to data that is able to be processed by a printer driver in operation 1201, and the data is transmitted to the printer driver.

In operation 1202, the printer driver of the computing device 100 renders the data obtained by converting the objects to convert the data into a rasterized raw image.

In operation 1203, the printer driver converts the rasterized raw image into an image format file. For example, the printer driver may convert the raw image into a JPEG file or to other format files which may be included in an output and document format file generated as a final format file.

In operation 1204, the printer driver generates a file that satisfies both conditions as an output format and a document format, including the image format file. For example, the printer driver may generate a PDF file that includes the JPEG file converted in operation 1203, or to other format file that satisfies both conditions as an output format and a document format.

Figure 13A:
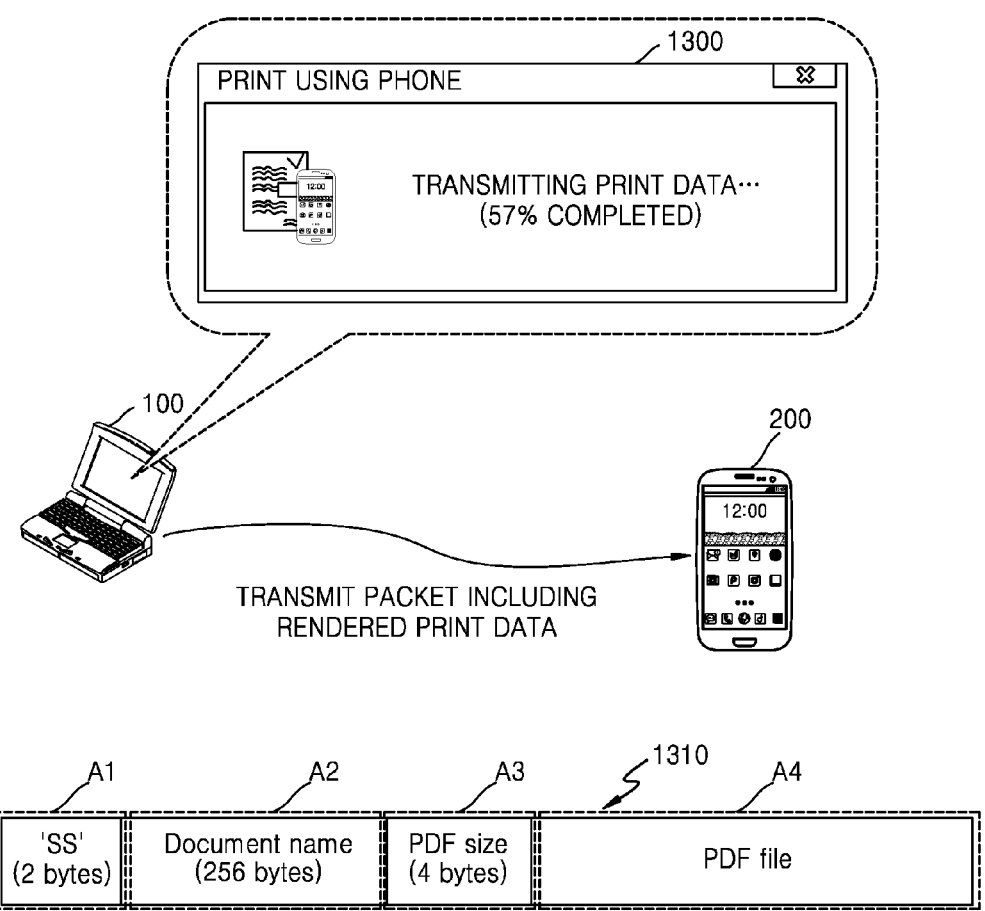
FIGS. 13A and 13B are views for explaining a process of transmitting rendered print data to a mobile terminal, according to an exemplary embodiment.
Figure 13B:
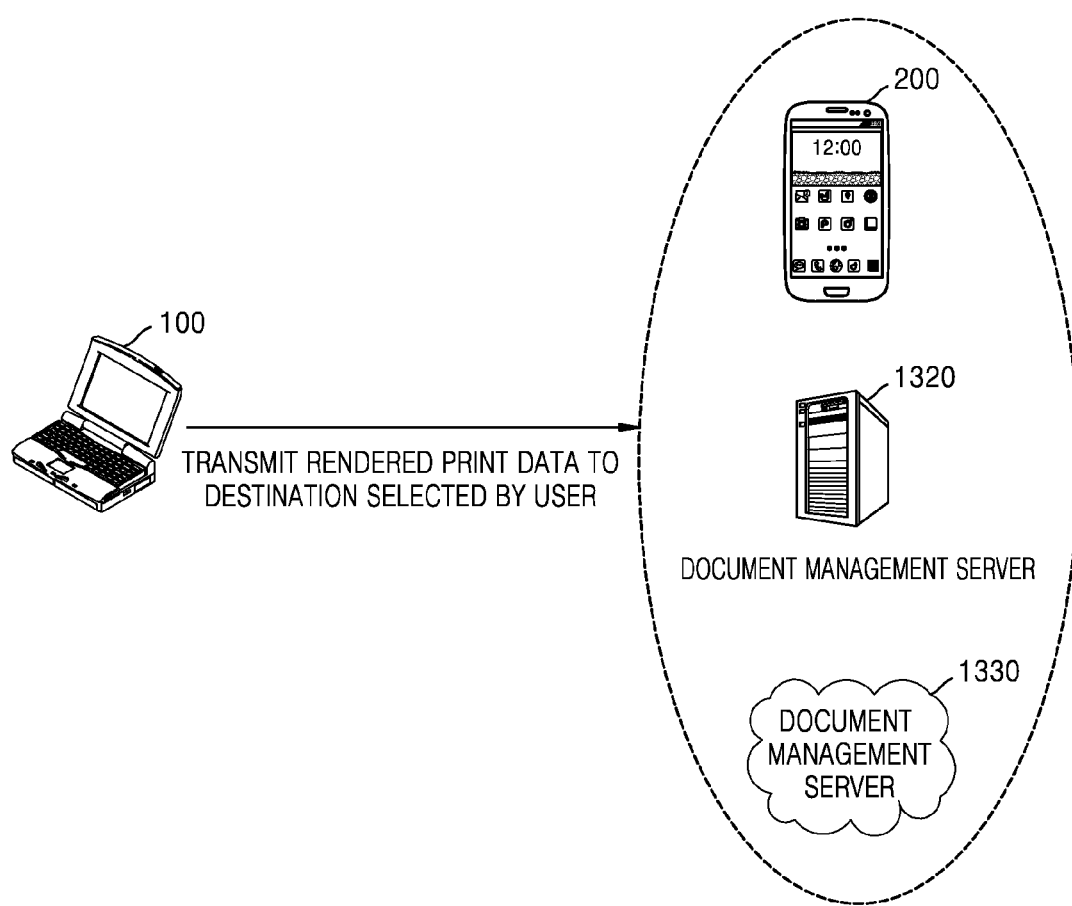

FIGS. 13A and 13B are views for explaining a process of transmitting rendered print data to a mobile terminal, according to an exemplary embodiment of the present disclosure.

Referring to FIG. 13A, the computing device 100 may transmit rendered print data to the mobile terminal 200 by using a transmission control protocol/Internet protocol (TCP/IP). A TCP server module included in the mobile terminal 200 receives the print data transmitted by the computing device 100.

FIG. 13A illustrates an example of a packet 1310 transmitted by the computing device 100 to the mobile terminal 200. Referring to FIG. 13A, area A1 of the packet 1310 includes a letter 'SS' of 2 bytes, indicating that the transmitted packet 1310 is for performing pull printing by using a mobile terminal. Also, a title of a document to be printed is input to area A2 within a range of 256 bytes or less, and the rendered print data, that is, a PDF file having a size of 4 bytes or less, is input to area A3. Finally, the rendered print data, that is, the PDF file, is attached to area A4.

While the rendered print data is being transmitted to the mobile terminal 200, the computing device 100 may display a popup 1300 including a message indicating that print data is being transmitted and a transmission completion rate, on a screen of the computing device 100.

An embodiment in which the computing device 100 transmits the rendered print data to the mobile terminal 200 is described above only. According to another exemplary embodiment of the present disclosure, the computing device 100 may transmit print data also to other devices or servers than the mobile terminal 200, and the mobile terminal 200 may receive the print data again from these devices or servers to perform pull printing.

Referring to FIG. 13B, for example, the computing device 100 may transmit print data to a destination selected by the user from among the mobile terminal 200, a document management server 1320, or a cloud storage 1330.

If print data is transmitted to the document management server 1320, the document management server 1320 may transmit the print data to the mobile terminal 200 again, and the mobile terminal 200 may perform pull printing of the received print data.

Also, if print data is transmitted to the cloud storage 1330, the mobile terminal 200 may access the cloud storage 1330 to download the print data, and the mobile terminal 200 may perform pull printing of the downloaded print data.

Figure 14:
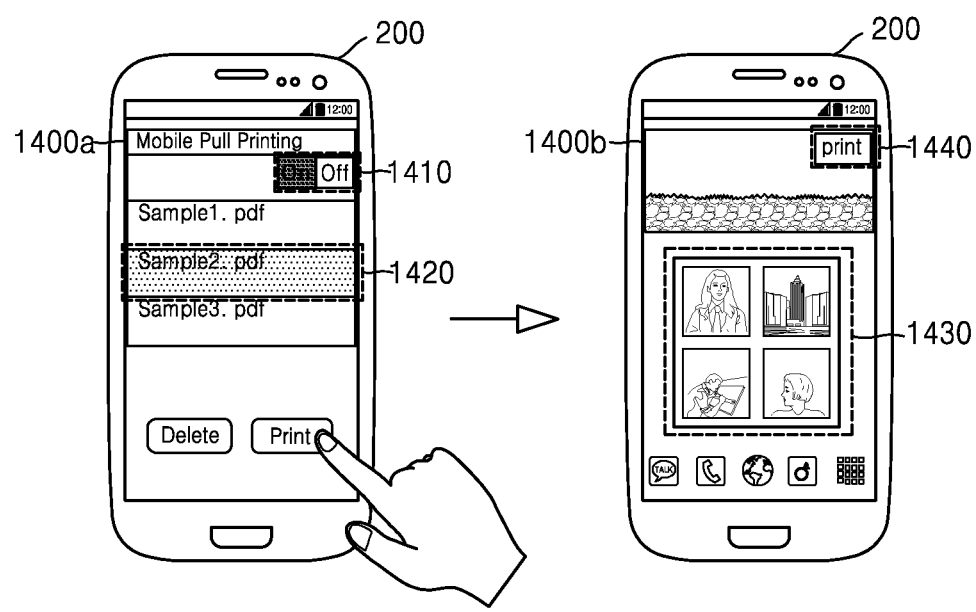
FIG. 14 is a view for explaining a function of providing a preview before printing print data stored in a mobile terminal, according to an exemplary embodiment.

FIG. 14 is a view for explaining a function of providing a preview before printing print data stored in the mobile terminal 200, according to an exemplary embodiment of the present disclosure.

Referring to FIG. 14, if the mobile terminal 200 receives rendered print data from the computing device 100, a list of received print data may be displayed on the display unit of the mobile terminal 200, as shown on a first screen 1400a. When a user selects one of the pieces of print data 1420 on the first screen 1400a from the list of print data and selects a 'PRINT' button, a preview 1430 of the selected print data 1420 may be displayed on the display unit of the mobile terminal 200, as shown on a second screen 1400b. The user may finally request printing of the selected print data 1420 by selecting the print button 1440 while the preview 1430 is displayed on the second screen 1400b.

Here, the preview 1430 displayed on the second screen 1400b shows a printing result, and thus, the user may check the quality of the printing result and layout thereof or the like in advance by checking the preview 1430 before finally performing printing.

An on/off button 1410 of the first screen 1400a is used to activate or inactivate the mobile terminal 200 in a state where a pull printing service using a mobile terminal is available. If the on/off button 1410 is on, the mobile terminal 200 is activated in a state where the pull printing service using a mobile terminal is available, and consequently, an SNMP agent and a TCP server module included in the mobile terminal 200 are activated.

Figure 15A:
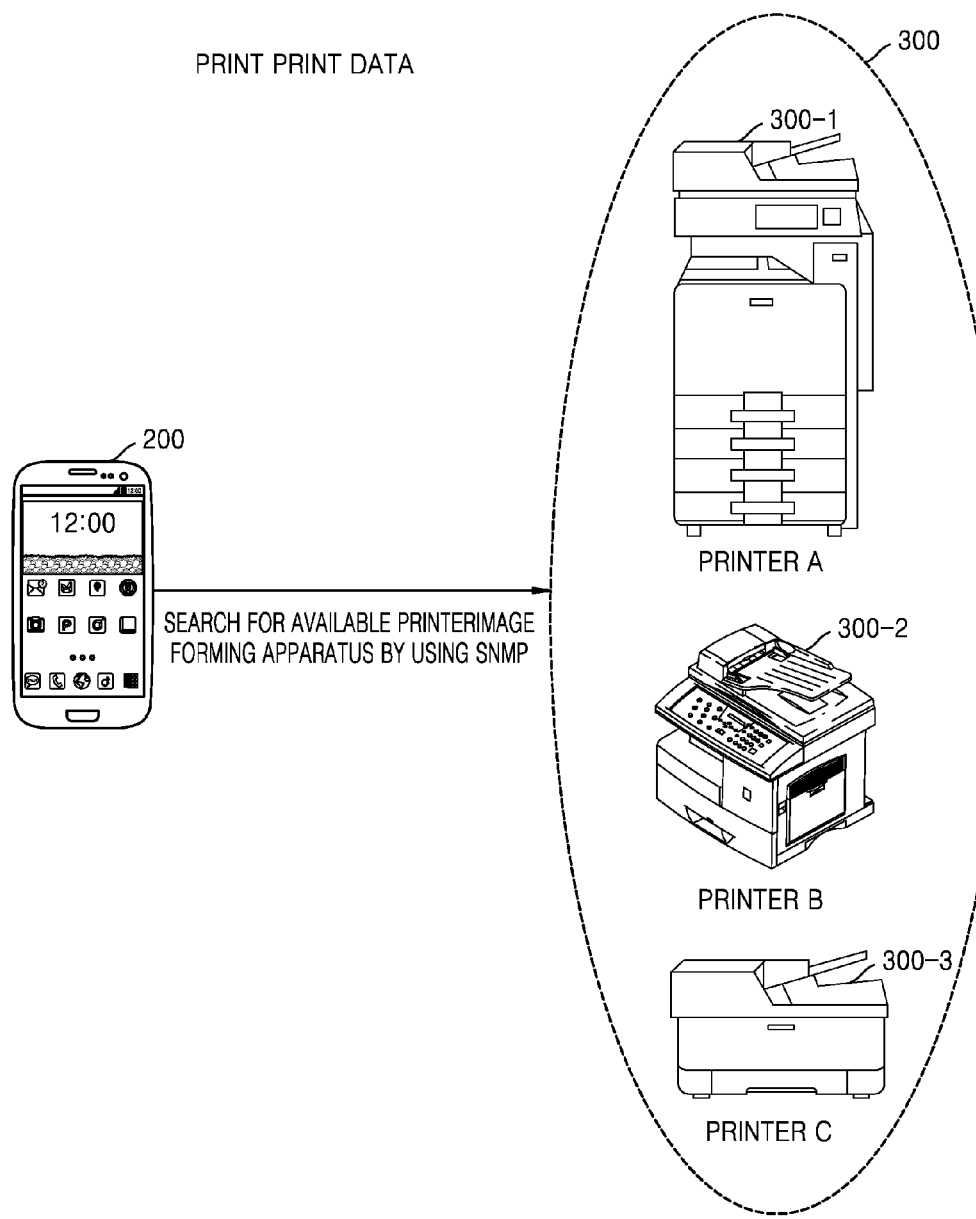
FIGS. 15A through 16 are views for explaining a process of performing printing by transmitting print data stored in a mobile terminal to an image forming apparatus, according to an exemplary embodiment.
Figure 15B:
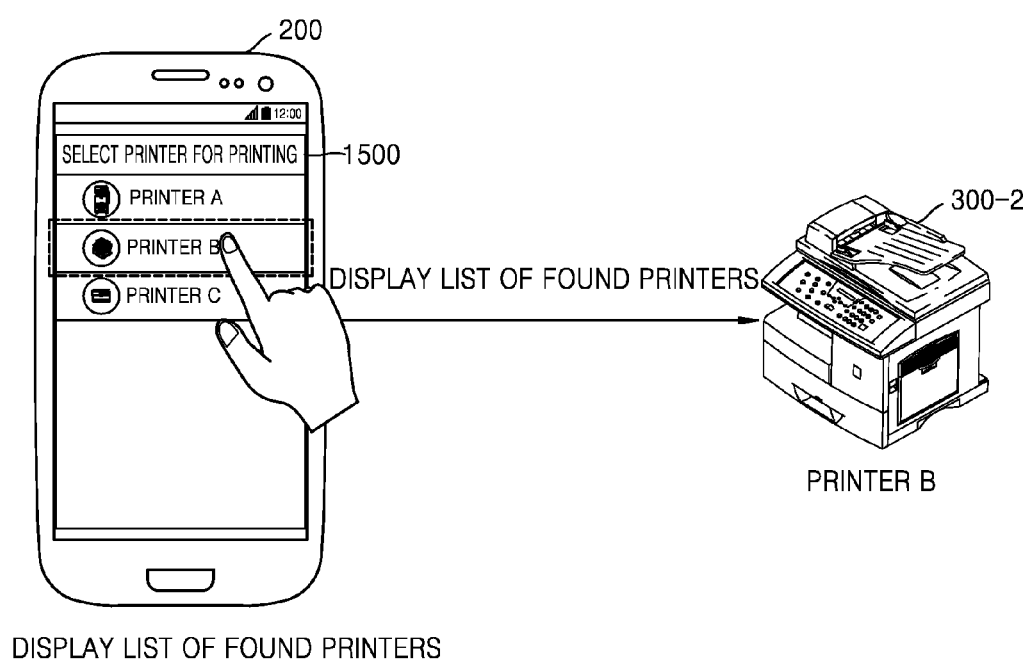
Figure 16:
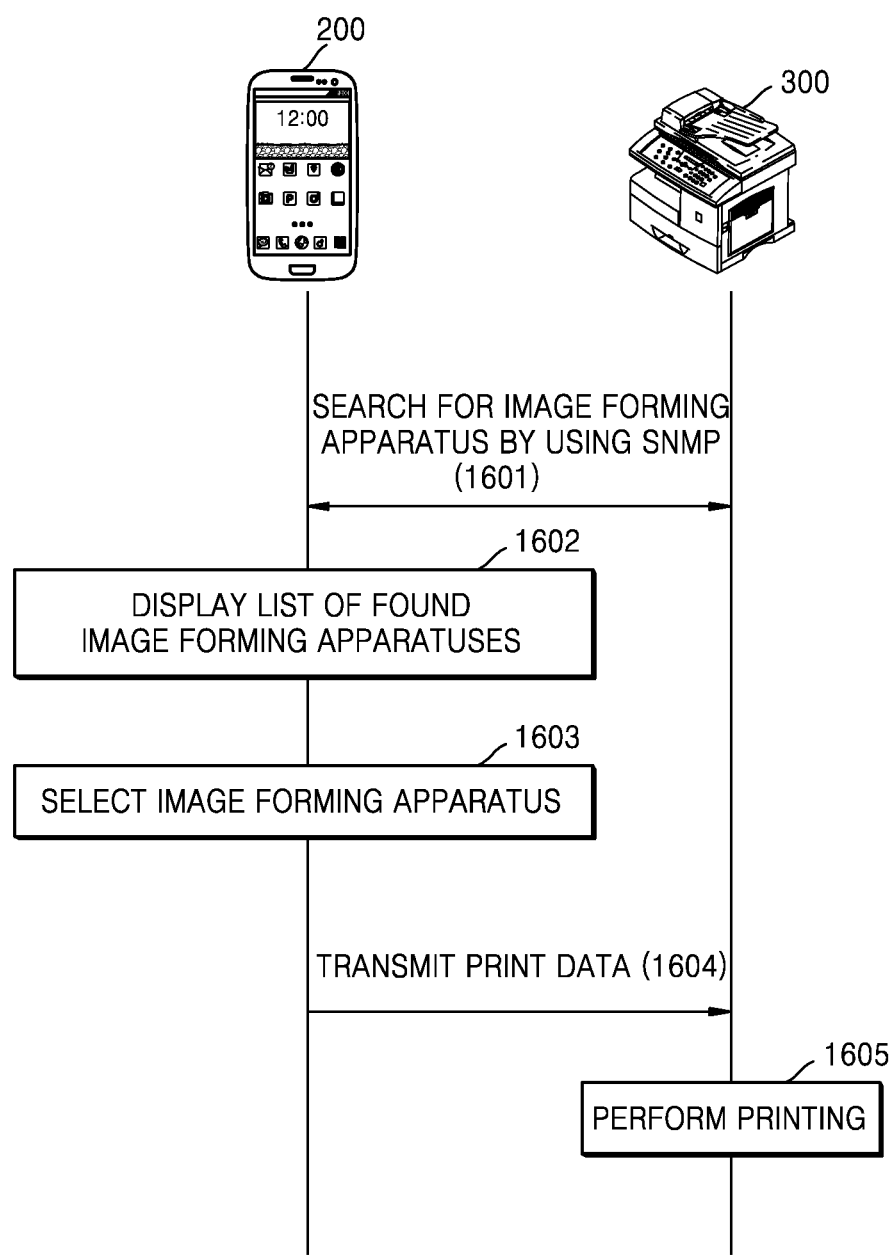

FIGS. 15A through 16 are views for explaining a process of performing printing by transmitting print data stored in the mobile terminal 200 to an image forming apparatus, according to an exemplary embodiment of the present disclosure.

Referring to FIG. 15A, the mobile terminal 200 searches for nearby available image forming apparatuses by using a SNMP. Referring to FIG. 15A, as a result of searching for image forming apparatuses connected to a local network, by using the mobile terminal 200, printer A 300-1, printer B 300-2, and printer C 300-3 are found. If the printer search is completed, the mobile terminal 200 displays a list of found printers on a screen thereof so that the user may select a printer to be used to print. FIG. 15B illustrates an example of selecting a printer to be used, from the list of found printers.

Referring to FIG. 15B, a screen 1500 including the list of found printers is displayed on the display unit of the mobile terminal 200. As illustrated in FIG. 15B, if the user selects printer B 300-2 from among the found printers, rendered print data is transmitted to the selected printer B 300-2 to request printing. Printer B 300-2 that has received the rendered print data performs printing.

FIG. 16 illustrates sequential operations of searching for a printer and transmitting print data, performed by using a mobile terminal.

Referring to FIG. 16, in operation 1601, the mobile terminal 200 searches for available image forming apparatuses by using a SNMP. In operation 1602, the mobile terminal 200 displays a list of found image forming apparatuses on a screen thereof. In operation 1603, the mobile terminal 200 receives a user input selecting one of the found image forming apparatuses. In operation 1604, the mobile terminal 200 transmits print data to the selected image forming apparatus 300. The transmitted print data is the print data that is received from a computing device and stored, and is rendered into a printable format tile. Finally, the image forming apparatus 300 that has received the print data performs printing in operation 1605.

As described above with reference to FIG. 13B, the computing device 100 does not directly transmit the rendered print data to the mobile terminal 200 but may transmit the same to the cloud storage 1330, and the mobile terminal 200 may access the cloud storage 1330 to download the print data and perform pull printing.

Figure 17:
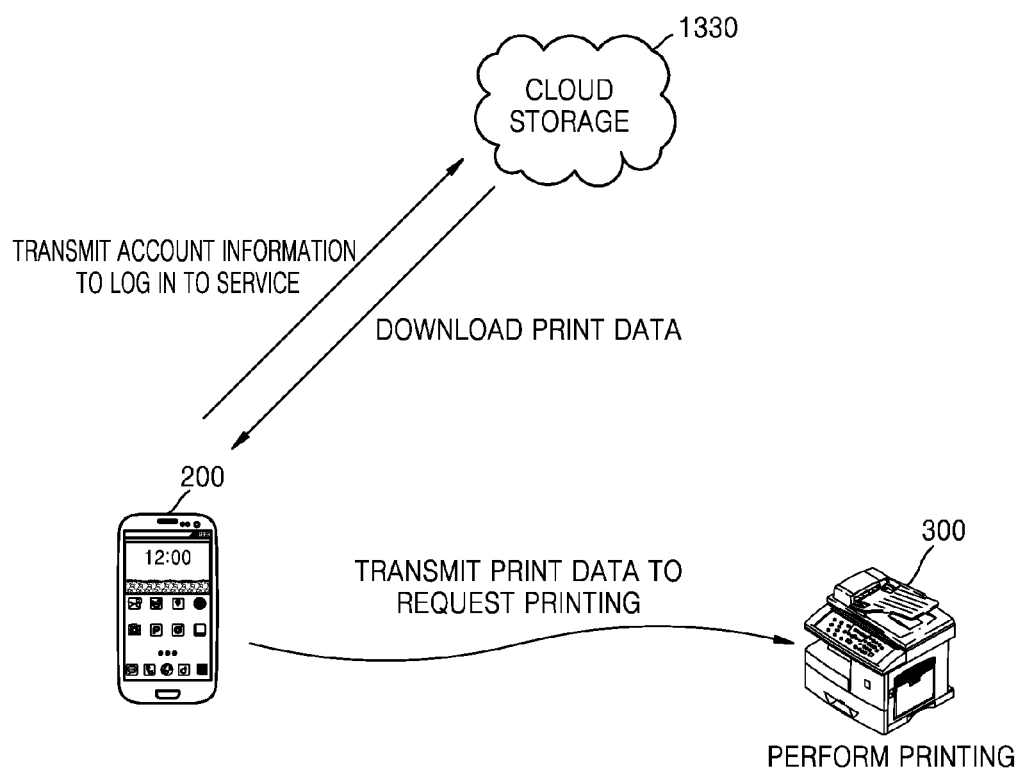
FIGS. 17 and 18 are views for explaining a process of performing pull printing by downloading print data stored in a cloud storage to a mobile terminal, according to an exemplary embodiment.
Figure 18:
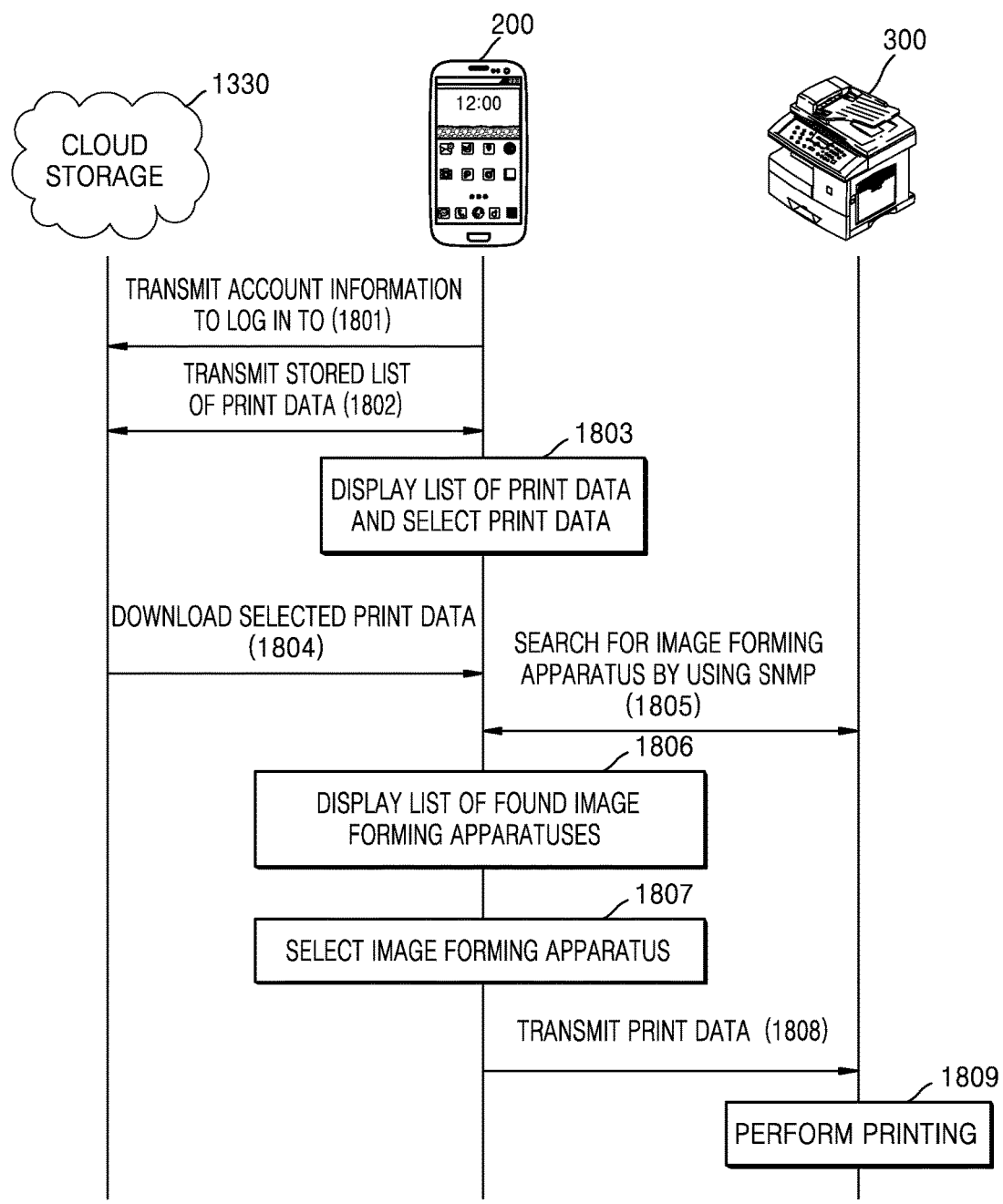

FIGS. 17 and 18 are views for explaining a process of performing pull printing by downloading print data stored in the cloud storage 1330 to the mobile terminal 200, according to an exemplary embodiment of the present disclosure.

Referring to FIG. 17, the mobile terminal 200 transmits user account information input by a user to the cloud storage 1330 to log in to a cloud storage service. When login is successful, the mobile terminal 200 may receive a list of print data stored in the cloud storage 1330 and display the list of print data on a screen. When the user selects print data that the user wishes to print, by viewing the list of print data displayed on the screen of the mobile terminal 200, the mobile terminal 200 downloads the selected print data from the cloud storage 1330. Next, the mobile terminal 200 transmits the downloaded print data to the image forming apparatus 300 to request printing.

Referring to FIG. 18, in operation 1801, the mobile terminal 200 transmits account information to the cloud storage 1330 to log in to a cloud storage service. In detail, when the mobile terminal 200 receives user account information regarding the cloud storage service, that is, a user ID and a password, from the user, the mobile terminal 200 transmits the received user ID and the received password to the cloud storage 1330 to log in to the cloud storage service.

In operation 1802, the cloud storage 1330 transmits a list of stored print data, that is, a list of rendered print data, received from a computing device, to the mobile terminal 200.

In operation 1803, the mobile terminal 200 displays the list of print data received from the cloud storage 1330 on a screen thereof, and one of the pieces of print data is selected from the list by the user.

In operation 1804, the mobile terminal 200 downloads the selected print data from the cloud storage 1330.

In operation 1805, the mobile terminal 200 searches for an available image forming apparatus by using an SNMP.

In operation 1806, the mobile terminal 200 displays a list of found image forming apparatuses on the screen thereof.

In operation 1807, the mobile terminal 200 receives a user input selecting one of the found image forming apparatuses.

In operation 1808, the mobile terminal 200 transmits to the selected image forming apparatus the print data downloaded in operation 1804.

In operation 1809, the image forming apparatus 300 performs printing of the received print data.

Figure 19:
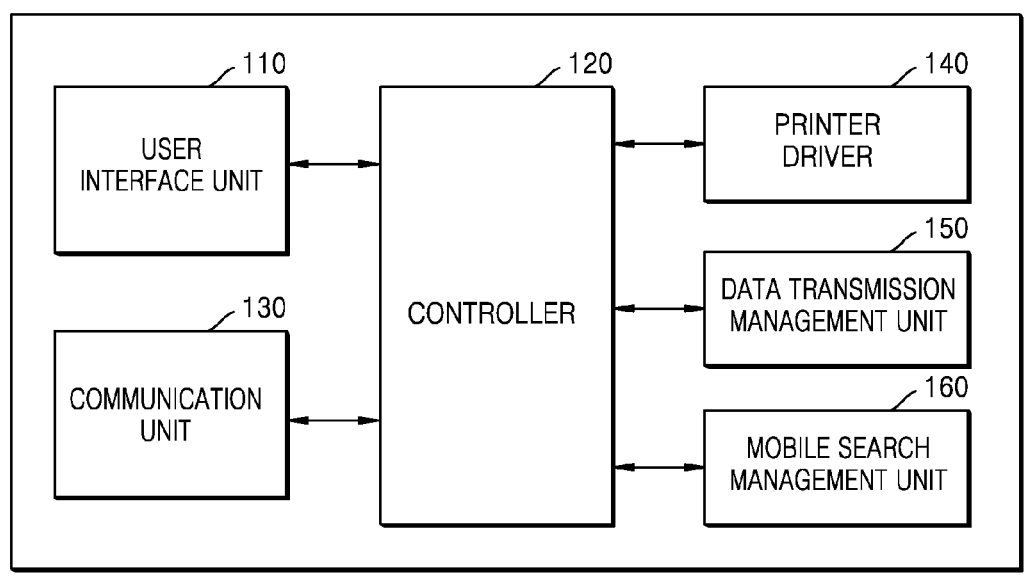
FIG. 19 illustrates a structure of a computing device according to an exemplary embodiment.

FIG. 19 illustrates a structure of a computing device 100 according to an exemplary embodiment of the present disclosure.

Referring to FIG. 19, the computing device 100 according to an exemplary embodiment of the present disclosure may include a user interface unit (user interface) 110, a controller 120, a communication unit (communicator) 130, a printer driver 140, a data transmission management unit (data transmission manager) 150, and a mobile search management unit (mobile search manager) 160.

The user interface unit 110 is used to provide information to a user and receive a user input, and may include, for example, a monitor and a keyboard. The computing device 100 may receive information indicating a print job and a printing method selected by a user. That is, the user may, via the user interface unit 110, select a print job such as a document or an image to be printed and select a method of printing the selected print job. In particular, the user may select pull printing by using a mobile terminal as a printing method. An operation of receiving a selection of a print job and a printing method via the user interface unit 110 is described above in detail with reference to FIGS. 4 and 5.

The controller 120 is used to control the overall operation of the computing device 100, and is, for example, a central processing unit (CPU).

The communication unit 130 is used to transmit or receive data via wired or wireless communication.

The printer driver 140 is used to render print data. In particular, the printer driver 140 renders print data into a printable format file. In detail, the printer driver 140 renders objects included in print data into a raw image, converts the raw image into an image format file such as a JPEG file, and generates a printable format file including the image format file, such as a PDF file.

A printing option regarding a print job may be set via the user interface unit 110, and the printer driver 140 may apply the set printing option to the print data and may render the print data to which the printing option is applied.

Examples of printing options may be a change of a layout, addition of information to each page, color setting, and printing quality setting. The printing options correspond to printing options for which information may be stored during a process, in which objects included in the print data are converted to a raw image and the raw image is converted to a general-use image format file.

However, if a command is provided by a printer driver to set printing options such as two-sided printing, setting of a paper feeding tray, or a type of paper, and if these options are implemented by an image forming apparatus in fact, the printing options may not be stored in an image format file or an output format tile and thus cannot be used.

The mobile search management unit 160 searches for a mobile terminal that may be used to perform pull printing, and the data transmission management unit 150 transmits print data rendered by using the printer driver 140 to a found mobile terminal via the communication unit 130.

In detail, the mobile search management unit 160 may search for at least one mobile terminal connected to a network to acquire a phone number, an IP address, and a port number of the found mobile terminal. The mobile search management unit 160 may display the phone number of the mobile terminal among the acquired information as identification information of the mobile terminal on the user interface unit 110.

When the user selects one of the phone numbers of the mobile terminals displayed on the user interface unit 110, the data transmission management unit 150 transmits rendered print data to a mobile terminal corresponding to the selected phone number by using the IP address and the port number acquired by using the mobile search management unit 160.

A process of searching for a mobile terminal performed by the mobile search management unit 160 is performed as follows: The mobile search management unit 160 transmits to a network a data packet requesting a phone number of a mobile terminal by using a UDP. A SNMP agent of a mobile terminal connected to the network generates, in response to the data packet transmitted by the mobile search management unit 160, a data packet including the phone number of the mobile terminal and transmits the data packet to the network by using a UDP. The mobile search management unit 160 of the computing device 100 receives the data packet transmitted by the SNMP agent of the mobile terminal to acquire the phone number of the mobile terminal. The mobile search management unit 160 may also request and acquire, besides the phone number the mobile terminal, an IP address, a port number, or the like of the mobile terminal.

If a list of mobile terminals used before exists, the mobile search management unit 160 may display the list of mobile terminals on the user interface unit 110. When the user selects one of the mobile terminals from the displayed list of mobile terminals, the mobile search management unit 160 requests the SNMP agent of the selected mobile terminal to determine availability. When the mobile search management unit 160 receives a response from the SNMP agent of the selected mobile terminal, the mobile search management unit 160 determines that the selected mobile terminal is available. However, if the mobile search management unit 160 does not receive a response from the SNMP agent of the selected mobile terminal, the mobile search management unit 160 determines that the selected mobile terminal is not available.

When a document to be printed is selected and pull printing is selected by using a mobile terminal as a printing method, via the user interface unit 110, the printer driver 140 transmits to the data transmission management unit 150 a title of the document and a job ID to inquire whether a pull printing function can be used. The data transmission management unit 150 receiving the inquiry may instruct the mobile search management unit 160 to request for a phone number, an IP address, and a port number of a mobile terminal to which print data is to be transmitted. The mobile search management unit 160 requests a mobile terminal connected to a network for a phone number, an IP address, and a port number thereof. Upon receiving a response from the mobile terminal, the mobile search management unit 160 generates a list of available mobile terminals and displays the list of available mobile terminals on the user interface unit 110. When the user selects one of the mobile terminals from the list of available mobile terminals, the mobile search management unit 160 transmits to the data transmission management unit 150 a phone number, an IP address, and a port number of the selected mobile terminal. The data transmission management unit 150 that has received the phone number, the IP address, and the port number from the mobile search management unit 160 responds to the printer driver 140 that a pull printing function can be used.

As described above, according to the one or more of the above exemplary embodiments, by performing pull printing by using a mobile terminal without a server, the costs for purchase of a server and maintaining the server may be saved. In addition, rendering content to be printed is performed not by using a mobile terminal but a computing device such as a PC, and thus, printing quality may be improved.

Processes, functions, methods, and/or software in apparatuses described herein may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

It should be understood that exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. A computing device supporting pull printing by using a mobile terminal, the computing device comprising:
   at least one memory comprising instructions and at least one hardware processor to execute the instructions within the at least one memory to implement:
   a user interface to receive an input to select a print job and a printing method;
   a communicator to transmit or receive data; and
   a processor to search for a mobile terminal, which is available to function as a server for the pull printing, among a plurality of mobile terminals if pull printing using the mobile terminal is selected as the printing method, render print data corresponding to the selected print job into a printable and mobile terminal openable format file, and transmit the rendered print data and an indicator indicating the pull printing using the mobile terminal is selected as the printing method to the searched mobile terminal by using the communicator.

2. The computing device of claim 1, wherein:
   if a list of previously used mobile terminals exists, the processor displays the list of previously used mobile terminals on the user interface, and
   when one of the previously used mobile terminals is selected from the list of previously used mobile terminals, the processor requests an SNMP agent of the selected previously used mobile terminal to determine whether the selected previously used mobile terminal is available.

3. The computing device of claim 1, wherein the processor renders objects included in the print data into a raw image, converts the raw image to an image format file, and generates the printable format file including the image format file.

4. The computing device of claim 1, wherein:
   the user interface provides a screen via which a printing option regarding the print job is set, and
   the processor applies the set printing option set via the user interface to the print data and renders the print data to which the set printing option is applied.

5. The computing device of claim 1, wherein:
   if the processor succeeds in searching for the mobile terminal, which is available for pull printing, the processor determines that pull printing is possible.

6. The computing device of claim 1, wherein the processor determines the available mobile terminal in response to the communicator receiving a response from the mobile terminal to a check request transmitted from the communicator of the computing device to the mobile terminal.

7. A computing device supporting pull printing by using one of a plurality of mobile terminals, the computing device comprising:
   at least one memory comprising instructions and at least one hardware processor to execute the instructions within the at least one memory to implement:
   a user interface configured to receive an input to select a print job and a printing method;
   a communicator configured to transmit or receive data; and
   a processor configured to search for mobile terminals, which are available to function as a server for pull printing, among a plurality of mobile terminals if pull printing using the mobile terminal is selected as the printing method, render print data corresponding to the selected print job into a printable and mobile terminal openable format file, and transmit the rendered print data and an indicator indicating the pull printing using the mobile terminal is selected as the printing method to one of the searched mobile terminals by using the communicator,
   wherein the processor acquires identification information of the searched mobile terminals and displays the identification information on the user interface, and
   wherein the processor transmits the rendered print data to the one of the searched mobile terminals corresponding to identification information selected by a user from among the identification information of the searched mobile terminals.

8. The computing device of claim 7, wherein:
the processor acquires a plurality of phone numbers, a plurality of IP addresses, and a plurality of port numbers of the searched mobile terminals connected to a network and displays the acquired phone numbers on the user interface, and
the processor transmits, by using one of the acquired IP addresses and one of the acquired port numbers, the rendered print data to the one of the searched mobile terminals corresponding to one of the phone numbers selected by a user from among the displayed phone numbers.

9. The computing device of claim 8, wherein the processor transmits a packet requesting the one of the phone numbers of the one of the searched mobile terminals to the network by using a user datagram protocol (UDP) and receives a data packet including the one of the phone numbers of the one of the searched mobile terminals from a simple network management protocol (SNMP) of the one of the searched mobile terminals connected to the network.

10. A system supporting pull printing comprising:
a computing device configured to receive a user input to select a print job and a printing method and configured to render print data corresponding to the selected print job;
a mobile terminal configured to receive the rendered print data from the computing device and configured to store the rendered print data, wherein the mobile terminal is available to function as a server for the pull printing; and
an image forming apparatus configured to receive the stored print data from the mobile terminal to print the print data,
wherein when pull printing using the mobile terminal is selected as the printing method, the computing device searches for the mobile terminal among a plurality of mobile terminals and renders the print data into a printable and mobile terminal openable format file to transmit the rendered print data and an indicator indicating the pull printing using the mobile terminal is selected as the printing method to the mobile terminal.

11. The system of claim 10, wherein when the mobile terminal receives a print request for the stored print data, the mobile terminal searches for an available image forming apparatus and transmits the stored print data to the available image forming apparatus.

12. A method of performing pull printing by using a mobile terminal, the method comprising:
receiving, by a computing device, a user input to select a print job and pull printing as a printing method;
searching, by the computing device, for a mobile terminal, which is available to function as a server for pull printing using the mobile terminal, among a plurality of mobile terminals;
rendering, by the computing device, print data corresponding to the selected print job into a printable and mobile terminal openable format file; and
transmitting, by the computing device, the rendered print data and an indicator indicating the pull printing using the mobile terminal is selected as the printing method to the searched mobile terminal.

13. The method of claim 12, wherein the searching for the mobile terminal comprises:

if a list of previously used mobile terminals exists, displaying the list of previously used mobile terminals on a user interface; and
when one of the previously used mobile terminals of the list of previously used mobile terminals is selected, requesting an SNMP agent of the selected previously used mobile terminal to determine whether the selected previously used mobile terminal is available.

14. The method of claim 12, wherein the rendering comprises:
rendering objects included in the print data into a raw image;
converting the raw image into an image format file; and
generating the printable format file including the image format file.

15. The method of claim 12, wherein:
the receiving of the user input selecting pull printing as a printing method comprises receiving information indicating a printing option regarding the selected print job, and
the rendering comprises applying the set printing option to the print data and rendering the print data to which the printing option is applied.

16. At least one non-transitory computer readable medium storing computer readable instructions which when executed control at least one processor to implement the method of claim 12.

17. A method of performing pull printing by using one of a plurality of mobile terminals, the method comprising:
receiving a user input to select a print job and pull printing as a printing method;
searching for mobile terminals, which are available to function as a server for pull printing using the mobile terminal, among a plurality of mobile terminals;
rendering print data corresponding to the selected print job into a printable and mobile terminal openable format file; and
transmitting the rendered print data to one of the searched mobile terminals,
wherein the transmitting of the rendered print data to one of the searched mobile terminals comprises:
displaying identification information of the searched mobile terminals on a screen;
receiving information indicating one selected piece of identification information of the searched mobile terminals; and
transmitting the rendered print data and an indicator indicating the pull printing using the mobile terminal is selected as the printing method to one of the searched mobile terminals corresponding to the one selected piece of identification information.

18. The method of claim 17, wherein:
the searching for mobile terminals comprises acquiring a plurality of phone numbers, a plurality of corresponding IP addresses, and a plurality of corresponding port numbers of mobile terminals connected to a network; and
the transmitting the rendered print data to one of the searched mobile terminals comprises:
displaying the phone numbers of the searched mobile terminals on a screen of a computing device,
receiving information indicating one of the phone numbers of the one of the searched mobile terminals that is selected, and
transmitting the rendered print data to the one of the searched mobile terminals corresponding to the selected phone number by using the corresponding acquired IP address and the corresponding acquired port number.

19. The method of claim 18, wherein the searching for mobile terminals comprises:
   transmitting a packet requesting the one of the phone numbers of the one of the mobile terminals by using a user datagram protocol (UDP) to the network; and
   receiving a data packet including the one of the phone numbers of the one of the mobile terminals from a simple network management protocol (SNMP) of the one of the mobile terminals connected to the network.

* * * * *